(12) United States Patent
Ignaczak

(10) Patent No.: US 8,191,211 B2
(45) Date of Patent: Jun. 5, 2012

(54) EXPANDABLE CLAMP

(75) Inventor: Brian T. Ignaczak, Rochester, MI (US)

(73) Assignee: Norma U.S. Holding LLC, Auburn Hills, MI (US)

( * ) Notice: Subject to any disclaimer, the term of this patent is extended or adjusted under 35 U.S.C. 154(b) by 192 days.

(21) Appl. No.: 12/695,755

(22) Filed: Jan. 28, 2010

(65) Prior Publication Data

US 2010/0186199 A1 Jul. 29, 2010

Related U.S. Application Data

(60) Provisional application No. 61/147,899, filed on Jan. 28, 2009.

(51) Int. Cl.
*F16L 33/08* (2006.01)
(52) U.S. Cl. .................................... 24/274 R
(58) Field of Classification Search . 24/274 R–274 WB, 24/20 LS; 277/602, 606, 607, 576, 616
See application file for complete search history.

(56) References Cited

U.S. PATENT DOCUMENTS

| | | | |
|---|---|---|---|
| 2,689,998 A * | 9/1954 | O'Shei ........................ 24/274 R |
| 2,820,276 A * | 1/1958 | Clauss, Jr. et al. .......... 24/274 R |
| 3,516,446 A | 6/1970 | O'Hargan et al. |
| 3,700,265 A | 10/1972 | Dufour et al. |
| 4,047,268 A * | 9/1977 | Buttriss ....................... 24/274 R |
| 4,097,171 A | 6/1978 | Fier |
| 4,872,780 A | 10/1989 | Bowman |
| 4,927,290 A | 5/1990 | Bowman |
| 5,044,822 A | 9/1991 | Moss |
| 5,095,564 A | 3/1992 | Kruger |
| 5,209,601 A | 5/1993 | Odill et al. |
| 5,316,407 A | 5/1994 | Miller |
| 5,431,459 A | 7/1995 | Gundy |
| 5,474,396 A | 12/1995 | Bravo |
| 5,496,128 A | 3/1996 | Odill |
| 5,732,955 A | 3/1998 | Skinner et al. |
| 6,389,654 B1 | 5/2002 | Tunno et al. |
| 6,607,219 B2 | 8/2003 | Mirales et al. |
| 6,805,359 B2 | 10/2004 | Neuhaus et al. |
| 6,953,194 B2 | 10/2005 | Brockway |
| 2004/0080118 A1 * | 4/2004 | Neuhaus et al. ............. 277/606 |
| 2005/0028329 A1 * | 2/2005 | Castellanos ................. 24/274 R |

* cited by examiner

*Primary Examiner* — James Brittain
(74) *Attorney, Agent, or Firm* — Reising Ethington P.C.

(57) ABSTRACT

An expandable clamp includes a band and a worm gear mechanism. The band makes an imaginary circumference and has a number of slots spaced apart from one another along the imaginary circumference. The worm gear mechanism is connected to the band and operates to radially expand and contract the imaginary circumference of the band. The worm gear mechanism includes a worm gear that has a threaded shank that engages the slots when the worm gear is rotated which causes the radial expansion and contraction of the imaginary circumference.

13 Claims, 3 Drawing Sheets

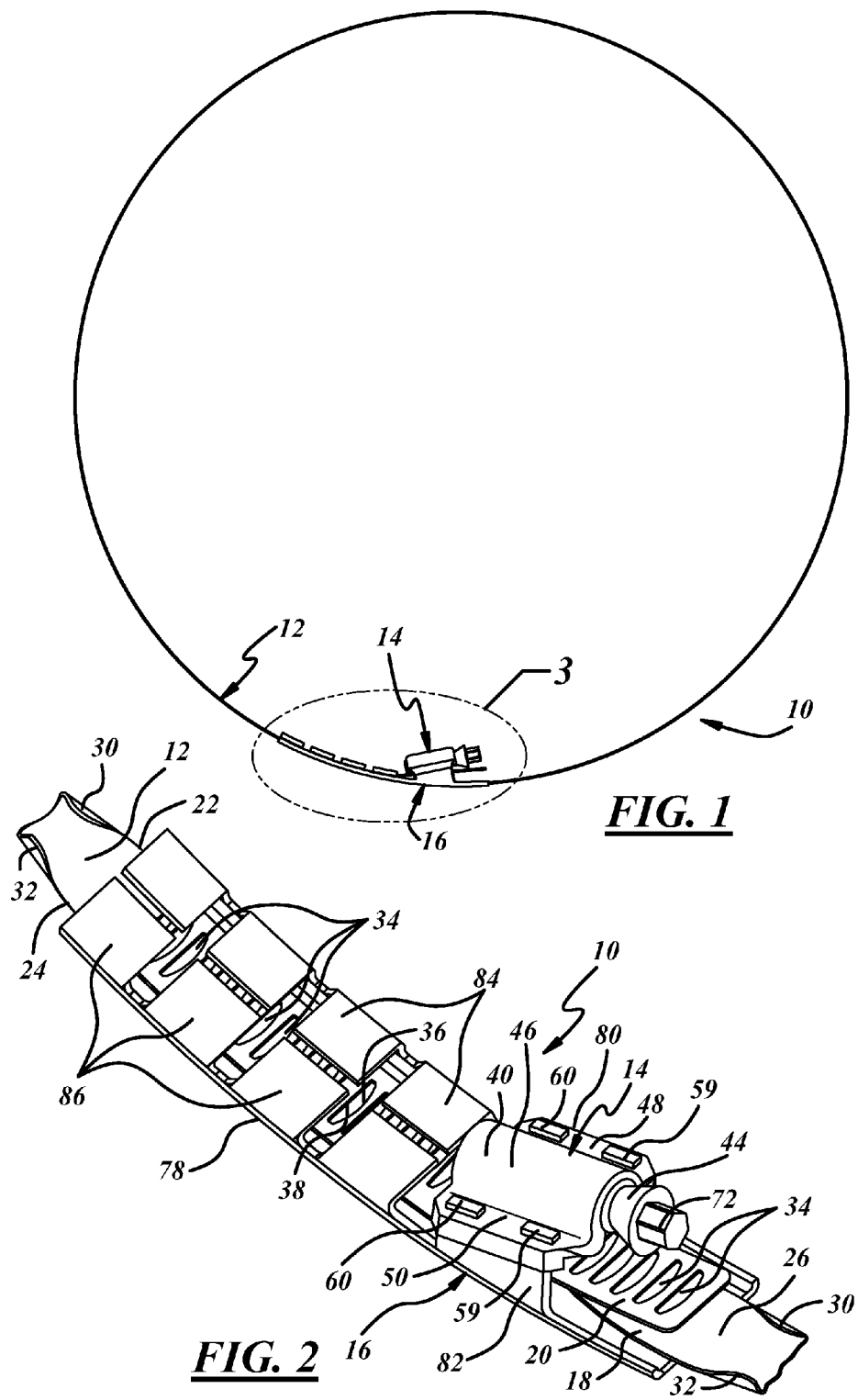

EXPANDABLE CLAMP

CROSS-REFERENCE TO RELATED APPLICATIONS

This application claims the priority of U.S. Provisional Patent Application No. 61/147,899, filed Jan. 28, 2009, the complete disclosure of which is hereby incorporated by reference.

TECHNICAL FIELD

This invention relates to radially expandable clamps used to exert radially outward forces against inwardly-facing surfaces.

BACKGROUND OF THE INVENTION

Radially expandable clamps are typically used to exert radially outward forces against confronting and inwardly-facing surfaces. As an example, an expandable clamp can be used in a pipe or joint of a sewer or drainage system, such as at a pipe and manhole riser juncture. The expandable clamp can secure an annular gasket against an inwardly-facing surface of the juncture. These types of expandable clamps often include a band and a mechanism to radially expand and contract the band.

SUMMARY OF THE INVENTION

One aspect of the invention is directed to an expandable clamp that includes a band and a worm gear mechanism. The band has a circumference and has multiple slots that are spaced apart with respect to one another along the circumference. The worm gear mechanism is connected to the band and can be operated in order to radially expand and contract the circumference of the band. The worm gear mechanism includes a worm gear that has a threaded shank engaging the slots when the worm gear is rotated in order to cause the radial expansion and contraction of the band. The worm gear has a longitudinal axis along the shank thereof that intersects the imaginary circumference of the band and makes an angle of about 5 to 30 degrees with respect to a line that is tangent to the imaginary circumference at the intersection.

Another aspect of the invention is directed to an expandable clamp that includes a band, a worm gear mechanism, and a backing support. The band extends in a circumferential direction from a first circumferential end to a second circumferential end, and has multiple slots that are spaced apart with respect to one another along an imaginary circumference of the band. The worm gear mechanism is located on an interior side of the circumference of the band. The worm gear mechanism causes radial expansion and contraction of the band and includes a housing and a worm gear. The housing encloses at least a portion of the worm gear. The worm gear has a threaded shank that engages the slots when the worm gear is rotated in order to cause the radial expansion or contraction of the band. The backing support positions the worm gear at a location where a head of the worm gear is at a distance farther away from the circumference of the band as compared to an oppositely-located terminal end of the worm gear.

BRIEF DESCRIPTION OF THE DRAWINGS

Preferred exemplary embodiments of the invention will hereinafter be described in conjunction with the appended drawings, wherein like designations denote like elements, and wherein:

FIG. 1 is a side view of an exemplary embodiment of an expandable clamp;

FIG. 2 is a perspective view of an exemplary embodiment of a worm gear mechanism used with the expandable clamp of FIG. 1;

DETAILED DESCRIPTION OF THE PREFERRED EMBODIMENTS

Figure 3:
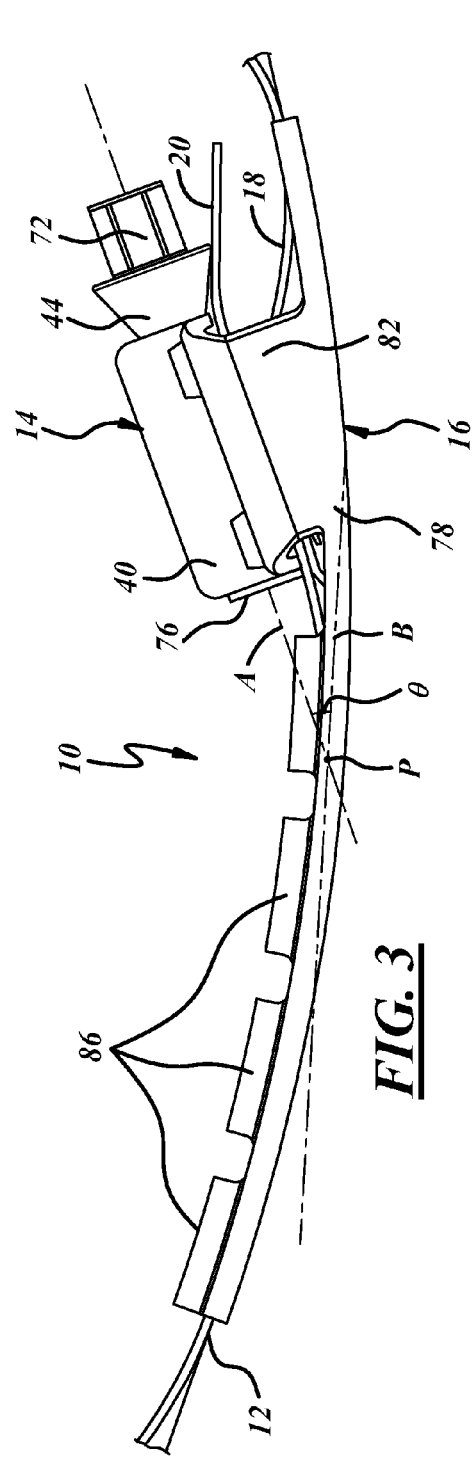
FIG. 3 is an enlarged view taken at oval 3 of FIG. 1.

Referring to the drawings, an exemplary embodiment of an expandable clamp 10 can be used in a pipe or joint in a sewer or drainage system to secure an annular gasket against an inwardly-facing surface thereof. The expandable clamp 10 exerts a substantially evenly-distributed outward force while maintaining its circular structure without buckling inward or otherwise collapsing during use. The expandable clamp 10 can be used in other applications not described here including interiors of other industrial pipes, and need not necessarily secure a gasket and instead could directly contact the inwardly-facing surface.

The expandable clamp 10 comprises an elongated piece of sheet metal with a width and a thickness, and the sheet metal is shaped into a mostly circular and cylindrical closed loop for use as shown in FIG. 1. The sheet metal can be a steel such as a 300 series stainless steel, or can be another suitable material. When looped, the expandable clamp 10 defines an axial direction, a radial direction, and a circumferential direction. The axial direction extends generally along or is generally parallel to a center axis of the loop, the radial direction extends generally along a radius of the loop, and the circumferential direction extends generally along a circumference of the loop.

Figure 4:
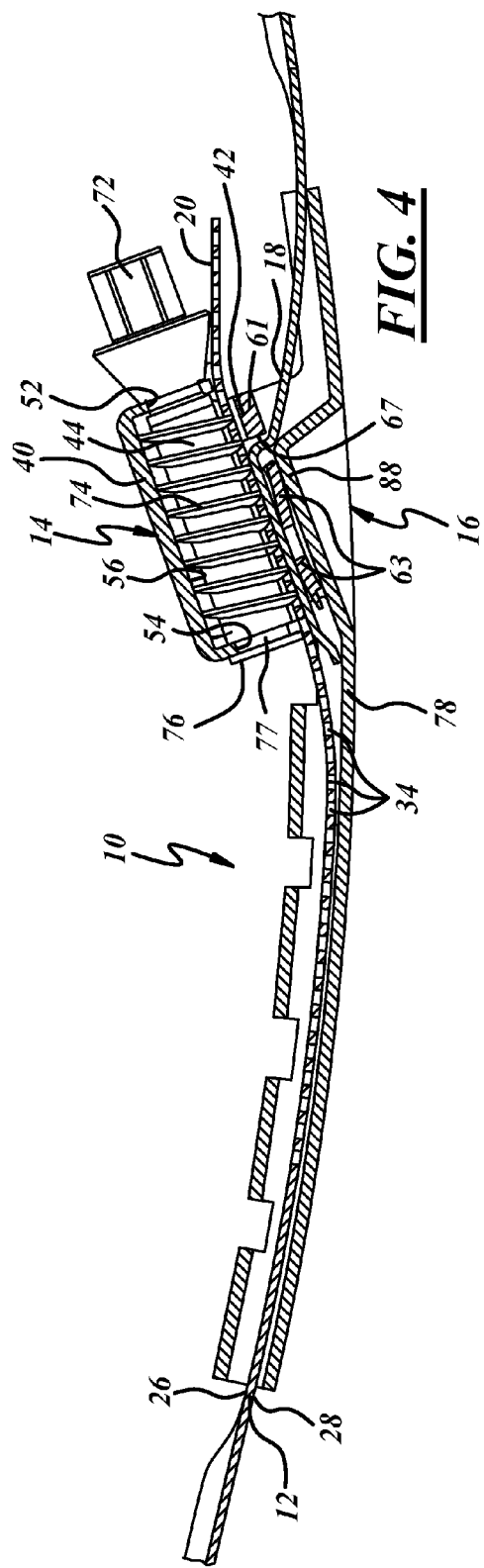
FIG. 4 is a partial sectional view of the expandable clamp of FIG. 1.
Figure 5:
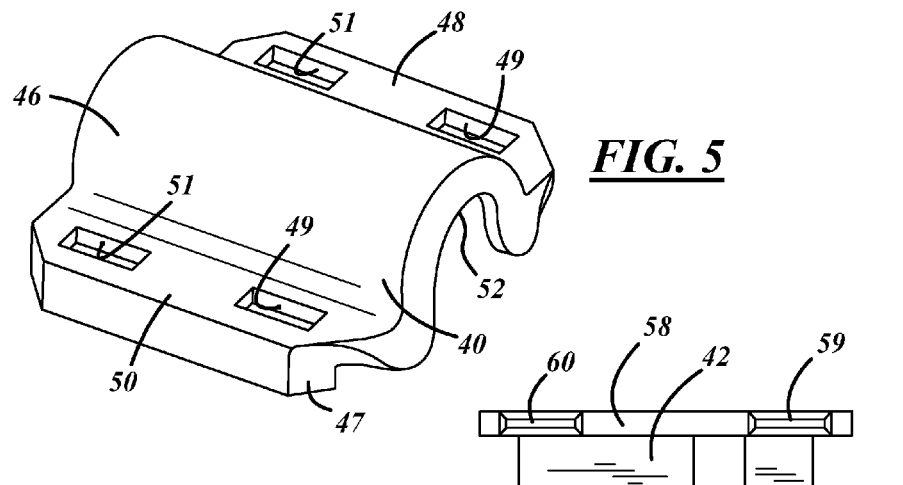
FIG. 5 is a perspective view of a housing of the worm gear mechanism of FIG. 2.
Figure 7:
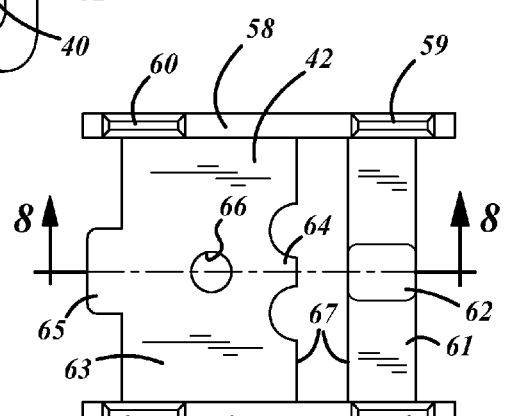
FIG. 7 is a top view of the saddle of FIG. 6.
Figure 6:
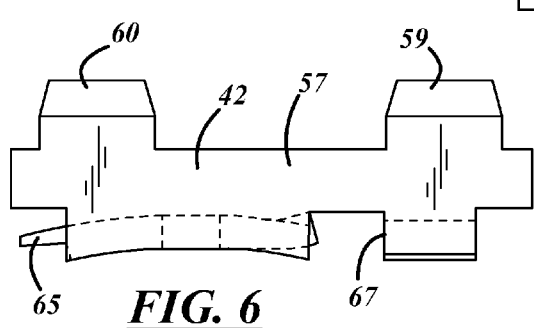
FIG. 6 is a side view of a saddle of the worm gear mechanism of FIG. 2.
Figure 8:
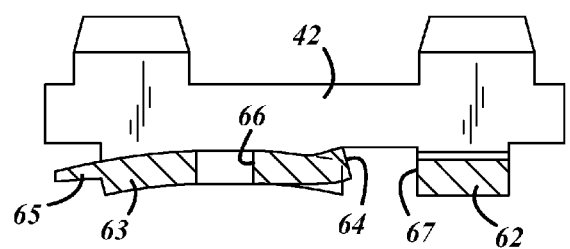
FIG. 8 is a sectional view taken at arrows 8-8 of FIG. 7.
Figure 9:
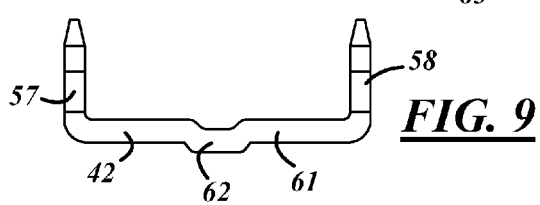
FIG. 9 is a front view of the saddle of FIG. 6.

In the illustrated embodiment, the expandable clamp 10 has a band 12, a worm gear mechanism 14, and a backing support 16. The band 12 is placed in the interior of a manhole (not shown) to exert a direct or indirect outward force against an associated confronting inwardly-facing surface. Referring to FIGS. 2 and 4, the band 12 extends circumferentially from a first circumferential end 18 to a second circumferential end 20. The first end 18 is connected to the worm gear mechanism 14, but could be connected to the backing support 16, or could be connected to both. As shown, the first end 18 is threaded in the worm gear mechanism 14 and mechanically interconnected with the worm gear mechanism; in another embodiment, the first end could be permanently connected to the worm gear mechanism such as by spot welding or could be permanently connected to the backing support 16. The second end 20 is not permanently connected and instead moves in response to operation of the worm gear mechanism 14. The band 12 extends axially from a first axial side 22 to a second axial side 24.

On a radially inwardly-facing side, the band 12 has an inner surface 26, and on a radially outwardly-facing side, the band has an outer surface 28 that, during use, confronts the inwardly-facing surface of the manhole. The band 12 also has first and second upturned edges 30, 32 located along the first and second sides 22, 24 to strengthen the band against buckling during use. The first and second upturned edges 30, 32 can each be segmented around the circumference of the band 12 to include separate upturned edges set apart by non-upturned edge portions, or the upturned edges can each be a single continuous upturned edge extending along a major portion of the band between the first and second ends 18, 20 with no intervening portions. As shown in FIG. 2, the upturned edges can extend around the band to a location adjacent each end of the backing plate 16. The first and second upturned edges 30, 32 form a 90° angle with the inner surface 26, but can form another angle. Instead or in addition to the upturned edges, one or more circumferentially-extending center rib(s) (not shown) can be formed in the band 12 at a position between the first and second sides 22, 24. Like the upturned edges, the center rib(s) strengthen the band 12 against buckling during use. The center rib(s) can be segmented around the circumference of the band 12 to include separate ribs set apart by non-ribbed portions, or the center rib(s) can be a single continuous rib extending along a major portion of the band between the first and second ends 18, 20 with no intervening portions.

The band 12 includes multiple slots 34 located near the second end 20 and extending a distance along the band toward the first end 18 determined by the expected or desired expansion and contraction adjustment amount. The slots 34 could have other locations such as a set distance away from the second end 20. The slots 34 are circumferentially and equally spaced apart from one another. Lengthwise, each slot 34 extends laterally (axial side to axial side) across the band 12. Each slot 34 has an arcuate surface 36 directed toward the second end 20, and has a planar surface 38 located opposite the arcuate surface. The arcuate surface 36 and planar surface 38 arranged this way allows the slots 34 to more easily mesh with threads of the worm gear mechanism 14. Each slot 34 can instead be rectangular in shape, or can be another shape. Moreover, although each slot is shown as an interruption or cut-out in the material of the band 12, the slots can instead comprise embossments or other depressions in the band that provide a suitable bearing service that engages the threads of the worm gear mechanism 14.

The worm gear mechanism 14 causes inward and outward adjustment of the band 12 and keeps the band at the adjusted position. The worm gear mechanism 14 is located in the interior of the circular band 12 and extends generally from the inner surface 26. In the illustrated embodiment, the worm gear mechanism 14 includes a housing 40, a saddle 42, and a worm gear 44.

The housing 40 acts as a top cover of the worm gear mechanism 14 and encloses a part of the worm gear 44. Referring to FIGS. 2-5, the housing 40 has a half-cylindrical section 46 and a pair of walls 48, 50 extending therefrom. In the FIG. 5, the housing 40 is separate from the backing support 16; in other embodiments the walls 48, 50 could be one-piece with the backing support or could be welded to the backing support. In the case where the housing 40 is a separate piece, a skirt 47 extends down from each wall 48, 50 and each wall has a pair of slots 49, 51 for receiving a part of the saddle 42. The housing 40 has a first opening 52 at one end, a second opening 54 at its other end, and has a cavity 56.

The saddle 42 acts as a bottom support for the worm gear 44 and connects the first end 18 of the band 12 to the worm gear mechanism 14. Referring to FIG. 4 and FIGS. 6-9, the saddle 42 has a first sidewall 57 and a second sidewall 58. Each sidewall 57, 58 has a pair of tabs 59, 60 extending therefrom that are received in respective slots 49, 51 to mechanically interconnect the saddle 42 to the housing 40. A first bottom wall 61 extends laterally between the sidewalls 57, 58 and has a bulge 62 formed therein at about a lateral centerline of the first bottom wall. A second bottom wall 63 is spaced longitudinally from the first bottom wall 61 and extends laterally between the sidewalls 57, 58. The second bottom wall 63 has an arcuate shape in the longitudinal direction as shown best in FIG. 8, has a first tongue 64 located at one longitudinal end and bent at an angle to the arcuate shape, and has a second tongue 65 extending from the other longitudinal end and following the arcuate shape. The second bottom wall 63 also has an opening 66 located therein. The saddle 42 includes a cutout 67 located between the first and second bottom walls 61, 63 and extending laterally between the sidewalls 57, 58. As shown best in FIG. 4, the cutout 67 receives a terminal end of the first end 18 when the band 12 is threadingly connected to the worm gear mechanism 14. In other embodiments, the first end 18 could be connected in other ways to the worm gear mechanism 14 such as being spot welded to one or more of the bottom walls.

The worm gear 44 is held between the housing 40 and the saddle 42, and rotates within the cavity 56 and engages the slots 34 to adjust the band 12. The worm gear 44 is generally arranged along the circumference of the band 12; that is, when compared to a bolt arranged laterally or transverse to the circumference or a bolt arranged radially to the circumference. The worm gear 44 has a head 72 constituting one terminal end of the worm gear and being exposed outside of the housing 40 at the first opening 52, and has a threaded shank 74 located within the housing. At a terminal end of the shank 74, the worm gear 44 has a protrusion 76 exposed outside of the housing 40 at the second opening 54 and extending from a necked down portion 77 of the worm gear. The protrusion 76 is one-piece with the shank 74, but could be a separate piece attached thereto such as by welding. The protrusion 76 is a diametrically-enlarged piece that can be a different size and/or shape than the second opening 54 so that it does not fit through the second opening such that, upon radial expansion of the band 12, the worm gear 44 is anchored to the housing 40. When radially expanded, a reaction force is generated that tends to urge the worm gear 44 in the direction of the head 72, but the worm gear is prevented from relative longitudinal movement within the housing 40 by the protrusion 76 bearing against the housing at the second opening 54. The protrusion 76 can have other locations and forms. For example, the protrusion 76 can be located within the housing 40 near the first opening 52 so that, when radially expanded, the protrusion bears against the housing at the first opening.

Referring to FIG. 3, the worm gear 44 defines a longitudinal axis A going through the length of the shank 74 and through the center axis of the shank. The longitudinal axis A intersects the circumference of the band 12 at a point P. An imaginary tangent line B touches the circumference of the band 12 at the point P and forms an angle θ with the longitudinal axis A. The angle θ locates the head 72 at a position away from the inner surface 26 of the band 12 so that the head is accessible to an operator for adjustment during use. The exact value of the angle θ can range between about 5° and 30°. In an example where the band 12 has about an 18 inch expanded diameter when in use, a desired angle θ is about 20°, and in an example where the band has about a 24 inch expanded diameter when in use, a desired angle θ is about 15°; of course other angles are possible with these example diameters. The value of the angle θ influences the tendency of the band 12 to buckle during use, the location at which the band may buckle, and the magnitude of the potential or resulting buckle. For example, the greater the value (e.g., 30°), the greater the tendency to buckle, the farther away from the worm gear 44 the band may buckle, and the greater the magnitude of the potential or resulting buckle. Conversely, the lesser the value (e.g., 10°), the lesser the tendency to buckle, the closer to the worm gear 44, and the lesser the magnitude of the potential or resulting buckle. Even when the angle θ is 0°, the band 12 may still buckle. As shown in FIGS. 3 and 4, the head 72 is located at a distance farther away from an imaginary circumference created by the loop-shaped expandable clamp 10 as compared to the protrusion 76; the distance being measured along an imaginary radius intersecting the circumference of the loop-shaped expandable clamp.

The backing support 16 supports the worm gear mechanism 14 and guides the band 12 along a portion of its circumferential extent. Referring to FIGS. 2-4, in the illustrated embodiment the backing support 16 includes a base 78, sidewalls 80, 82, a first set of tabs 84, and a second set of tabs 86. The base 78 has an arcuate shape that generally follows the circumference of the band 12. The base 78 is located outside of the circumference of the band 12 and confronts the outer surface 28 of the band. The base 78 has a ramp 88 to support the position of the worm gear mechanism 14 and to locate the bottom walls 61, 63 against the end 18 of the band 12. The sidewalls 80, 82 extend from the base 78 and to the walls 48, 50. The sidewalls 80, 82 also support the position of the worm gear mechanism 14.

The first and second set of tabs 84, 86 extend from the base 78 and wrap around the band 12 to confront the inner surface 26 in order to prevent the band from buckling inwardly during use. The first and second set of tabs 84, 86 also guide lateral alignment of the second end 20 with the worm gear mechanism 14 when they are initially brought together. In the illustrated embodiment, each of the set of tabs 84, 86 has four separate and distinct tabs that are folded over and extend axially to about a midsection of the band 12. In other embodiments, the tabs can have different constructions and arrangements including a single tab on each side of the base having a similar circumferential extent of the four separate tabs, one or more tabs could extend from only one side of the base and stretch to the other side, and there may be more or less than four tabs on each side.

In an application requiring a relatively larger expanded diameter such as 60 inches, a pair or more of worm gear mechanisms and backing supports can be provided instead of only one. In the case of a pair, the worm gear mechanisms and backing supports can be spaced apart along the circumference of the expandable clamp and between a pair of bands that together form a complete loop. The above description of the single worm gear mechanism, backing support, and band applies equally to the pair of worm gear mechanisms, backing supports, and bands here. Some modifications may be suitable including increasing the axial width of the bands to strengthen the bands against buckling.

In use, the expandable clamp 10 can be expanded and contracted to respectively increase and decrease its outer diameter. In this example, the expandable clamp 10 is placed within the pipe or joint, and the gasket is positioned outside of and around the clamp. An operator turns the worm gear 44 in the clockwise direction to radially expand the band 12 against the gasket, and the gasket in turn is urged against the inwardly-facing surface of the manhole. The worm gear mechanism 14 maintains the radially expanded position of the band 12 and the gasket is kept against the inwardly-facing surface for sealing therewith.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An expandable clamp, comprising
a band having a circumference and having a plurality of slots spaced apart along the circumference; and
a worm gear mechanism located at an inner surface of said band within the circumference of said band and operable to radially expand and contract the circumference of said band, said worm gear mechanism including a worm gear having a threaded shank engaging said slots upon rotation of said worm gear to cause radial expansion and contraction of said band, said worm gear having a longitudinal axis along said shank that intersect the circumference of said band and makes an angle of about 5 to 30 degrees relative to a line tangent to the circumference at the intersection.

2. The expandable clamp of claim 1, wherein said band extends axially from a first axial side to a second axial side, said first and second axial sides each having an upturned edge located along at least a part of the circumferential extent of said band.

3. The expandable clamp of claim 1, wherein each of said slots has an arcuate surface and a planar surface located opposite said arcuate surface, said surfaces engaging said shank upon rotation and upon radial expansion and contraction of said band.

4. The expandable clamp of claim 1, wherein said worm gear mechanism includes a housing and said worm gear has a protrusion extending from said shank, said housing enclosing at least a part of said shank, wherein, upon rotation of said worm gear and radial expansion of said band, said protrusion bears against said housing to prevent relative movement in the direction of the longitudinal axis of said shank between said worm gear and said housing.

5. The expandable clamp of claim 1, wherein the longitudinal axis intersects the circumference of said band and forms an angle of about 15 to 20 degrees relative to the tangent line.

6. The expandable clamp of claim 1, further comprising a backing support located on said band at said worm gear mechanism, said backing support confronting an outer surface of a portion of said band and having one or more tabs extending around at least one axial side of said band to confront said inner surface of said band, said one or more tabs preventing said band from buckling inwardly at said worm gear mechanism upon rotation of said worm gear and radial expansion of said band.

7. The expandable clamp of claim 6, wherein said worm gear mechanism is supported by said backing support.

8. The expandable clamp of claim 1, wherein the slots comprise cut-outs in said band.

9. An expandable clamp comprising:
a band extending circumferentially from a first circumferential end to a second circumferential end, said band having a plurality of slots spaced apart from one another along a circumference of said band;
a worm gear mechanism located on an interior side of the circumference of said band, said worm gear mechanism including a housing and a worm gear, said housing enclosing at least a portion of said worm gear, said worm gear having a threaded shank engaging said slots upon rotation of said worm gear to cause the radial expansion or contraction of said band; and
a backing support positioning said worm gear to locate a head of said worm gear farther away from the circumference of said band than an oppositely-located terminal end of said worm gear.

10. The expandable clamp of claim 9, wherein said worm gear mechanism includes a saddle connected to said housing, said saddle connecting said first circumferential end of said band to said worm mechanism in order to maintain a fixed position of said first circumferential end of said band during expansion and contraction of said band while said second circumferential end is free to move through said worm gear mechanism.

11. The expandable clamp of claim 10, wherein said saddle has a cutout located in a wall thereof to receive insertion of said first circumferential end of said band in order to connect said first circumferential end to said worm gear mechanism.

12. The expandable clamp of claim 9, wherein said backing support has a base confronting an outer surface of said band and extending along a portion of the circumferential extend of said band, said base facilitating initial engagement of said second circumferential end and said worm gear mechanism, said backing support having at least one tab that extends from said base and around at least a portion of said band and that confronts an inner surface of said band.

13. The expandable clamp of claim 9, wherein the slots comprise cut-outs in said band.

* * * * *